United States Patent
Pilkington et al.

(10) Patent No.: US 11,082,526 B2
(45) Date of Patent: Aug. 3, 2021

(54) OPTIMIZING LARGE PARAMETER PASSING IN A SERVICE MESH

(71) Applicant: INTERNATIONAL BUSINESS MACHINES CORPORATION, Armonk, NY (US)

(72) Inventors: Adam John Pilkington, Eastleigh (GB); Gordon Douglas Hutchison, Eastleigh (GB); Timothy J. Mitchell, Chandlers Ford (GB); Graham C. Charters, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 10 days.

(21) Appl. No.: 16/543,757

(22) Filed: Aug. 19, 2019

(65) Prior Publication Data
US 2021/0058484 A1    Feb. 25, 2021

(51) Int. Cl.
*G06F 15/173*      (2006.01)
*H04L 29/08*       (2006.01)

(52) U.S. Cl.
CPC .......... *H04L 67/32* (2013.01); *H04L 67/2842* (2013.01)

(58) Field of Classification Search
CPC ............................ H04L 67/32; H04L 67/2842
USPC ....................................................... 709/223
See application file for complete search history.

(56) References Cited

U.S. PATENT DOCUMENTS

| | | | |
|---|---|---|---|
| 9,495,227 B2* | 11/2016 | Cooke | G06F 9/542 |
| 9,621,399 B1* | 4/2017 | Parakh | H04L 29/06047 |
| 9,648,125 B2* | 5/2017 | Flack | H04N 21/23106 |
| 9,794,370 B2* | 10/2017 | Abbasi | H04L 47/70 |
| 9,875,184 B2* | 1/2018 | Drzewiecki | G06F 12/0802 |
| 9,965,515 B2* | 5/2018 | Kumar | H04L 67/2842 |
| 10,042,949 B1* | 8/2018 | Farner | G06F 16/9574 |
| 10,129,354 B2* | 11/2018 | Long, III | H04L 67/32 |
| 10,623,390 B1* | 4/2020 | Rosenhouse | H04L 63/08 |
| 10,673,749 B1* | 6/2020 | Rastogi | H04L 45/44 |
| 10,713,080 B1* | 7/2020 | Brooker | H04L 67/1004 |
| 10,761,813 B1* | 9/2020 | Echeverria | G06N 5/04 |
| 10,764,244 B1* | 9/2020 | Mestery | H04L 61/251 |
| 10,771,550 B2* | 9/2020 | Kusters | G06F 3/0635 |
| 10,776,355 B1* | 9/2020 | Batsakis | G06F 16/24539 |
| 10,812,882 B2* | 10/2020 | Winterrowd | H04Q 11/0071 |
| 2017/0078410 A1 | 3/2017 | Rao | |
| 2017/0195451 A1* | 7/2017 | Backholm | H04L 67/2852 |
| 2017/0279910 A1 | 9/2017 | Maria | |
| 2017/0331812 A1 | 11/2017 | Lander | |

(Continued)

FOREIGN PATENT DOCUMENTS

CN      107483538 A    12/2017

*Primary Examiner* — Melvin H Pollack
(74) *Attorney, Agent, or Firm* — L. Jeffrey Kelly (57) ABSTRACT

A computer-implemented method, apparatus, system and computer program product for optimizing parameter data passing between services in a service mesh, the method including receiving, at a first service, a request for the first service, the request including parameter data; storing the parameter data in a request parameter store, retrieving the parameter data from the request parameter store; the first service initiating a request for a second service, the parameter data in the request being replaced by a unique token identifying the parameter data in the request parameter store; and responsive to the second service using the parameter data, retrieving the parameter data from the request parameter store.

15 Claims, 9 Drawing Sheets

(56) References Cited

U.S. PATENT DOCUMENTS

| | | | |
|---|---|---|---|
| 2019/0102346 A1* | 4/2019 | Wang | G06F 16/906 |
| 2019/0268408 A1* | 8/2019 | Brasetvik | H04L 67/1097 |
| 2019/0268431 A1* | 8/2019 | Brasetvik | H04L 67/2814 |
| 2019/0324881 A1* | 10/2019 | Buffone | H04L 67/02 |
| 2020/0036601 A1* | 1/2020 | Wang | G06F 9/5077 |
| 2020/0133789 A1* | 4/2020 | Natanzon | G06F 16/2365 |
| 2020/0153928 A1* | 5/2020 | Chauhan | H04L 67/1063 |
| 2020/0236108 A1* | 7/2020 | Mital | H04L 63/0428 |
| 2020/0252220 A1* | 8/2020 | McBride | H04L 9/0643 |
| 2020/0322444 A1* | 10/2020 | Stefanko | H04L 67/2833 |

* cited by examiner

OPTIMIZING LARGE PARAMETER PASSING IN A SERVICE MESH

BACKGROUND

The present invention relates to controlling traffic between services in computer systems, and more specifically to large parameter passing in a service mesh.

A service mesh is a configurable infrastructure layer for a microservices application which helps control traffic between services in computer systems, enabling load balancing, scaling, AB testing, canary testing and the like.

Microservice interactions can be simple small requests with responses, passing small amounts of parameter data from one service to another, or they can be more complex. For example, large amounts of parameter data may be passed, such as large records or images, and data may be passed along sequences of microservices. In such examples, each microservice performs a subset of an overall application function and may use only a subset of the parameter data. Frequently, a microservice will act as a conduit for additional parameter data that is needed by other downstream microservices. The additional parameter data is passed from one service to another leading to unnecessary resource usage, such as network, memory and CPU usage. In cloud environments where billing is based on usage of these resources, this can be financially costly and also adversely affect performance. Consequently, a microservices architecture can result in more data transfer costs than traditional 'monolithic' applications and with the increasing adoption of microservice architecture there is pressure to reduce these additional data transfer costs as much as possible.

SUMMARY

Embodiments of the invention provide a computer-implemented method for optimizing parameter data passing between services in a service mesh, including receiving, at a first service, a request for the first service, the request including parameter data; storing the parameter data in a request parameter store; responsive to the first service using the parameter data, retrieving the parameter data from the request parameter store; the first service initiating a request for a second service, the parameter data in the request being replaced by a unique token identifying the parameter data in the request parameter store; checking whether the second service uses the parameter data; and responsive to the second service using the parameter data, retrieving the parameter data from the request parameter store.

Embodiments of the invention provide apparatus for optimizing parameter data passing between a first service and a second service in a service mesh, including a provider sidecar which receives a request for the first service, the request including parameter data, stores the parameter data in a request parameter store; a first service which, responsive to the first service using the parameter data, requests the provider sidecar to retrieve the parameter data from the request parameter store, the first service initiating a request for a second service to a provider sidecar associated with the second service, the parameter data in the request being replaced by a unique token identifying the parameter data in the request parameter store; and a second service which checks whether it uses the parameter data, and responsive to the second service using the parameter data, requests the provider sidecar associated with the second service to retrieve the parameter data from the request parameter store.

Embodiments of the invention also provide a computer program product for optimizing parameter data passing between services in a service mesh, the computer program product including a computer readable storage medium having program instructions embodied within, the program instructions executable by a computer to cause the computer to: receive, at a first service, a request for the first service, the request including parameter data; store the parameter data in a request parameter store; responsive to the first service using the parameter data, retrieve the parameter data from the request parameter store; initiate a request by a first service for a second service, the parameter data in the request being replaced by a unique token identifying the parameter data in the request parameter store; and responsive to the second service using the parameter data, retrieve the parameter data from the request parameter store.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to controlling traffic between services in computer systems, and more specifically to large parameter passing in a service mesh. The following described exemplary embodiments provide a system, method, and program product to, among other things, pass parameter data between a number of microservices. Therefore, the present embodiment has the capacity to improve the technical field of controlling traffic between services in computer systems by determining parameter data required by services and providing the data to the host prior to the request from the host, reducing execution time of the service.

The following described exemplary embodiments provide a system, method, and program product for determining parameter data required by services and providing the data to the host prior to the request from the host, reducing execution time of the service.

In embodiments of the present invention a service mesh may include a "Request Parameter Store" (RPS) such that, where beneficial, data to be transferred between services is essentially tokenized out of the service requests and the data is only delivered to those services that utilize it. The Request Parameter Store holds the data for the duration of the request as it flows through the service mesh and the data is then marked for deletion once the service request completes. If the data is used by a service, then the service mesh retrieves the data and makes it available to the service. Optionally, the Request Parameter Store may hold the data after the service request completes. In the event that a subsequent request includes the same data, then that data may already be in a cache for the Request Parameter Store.

Figure 1:
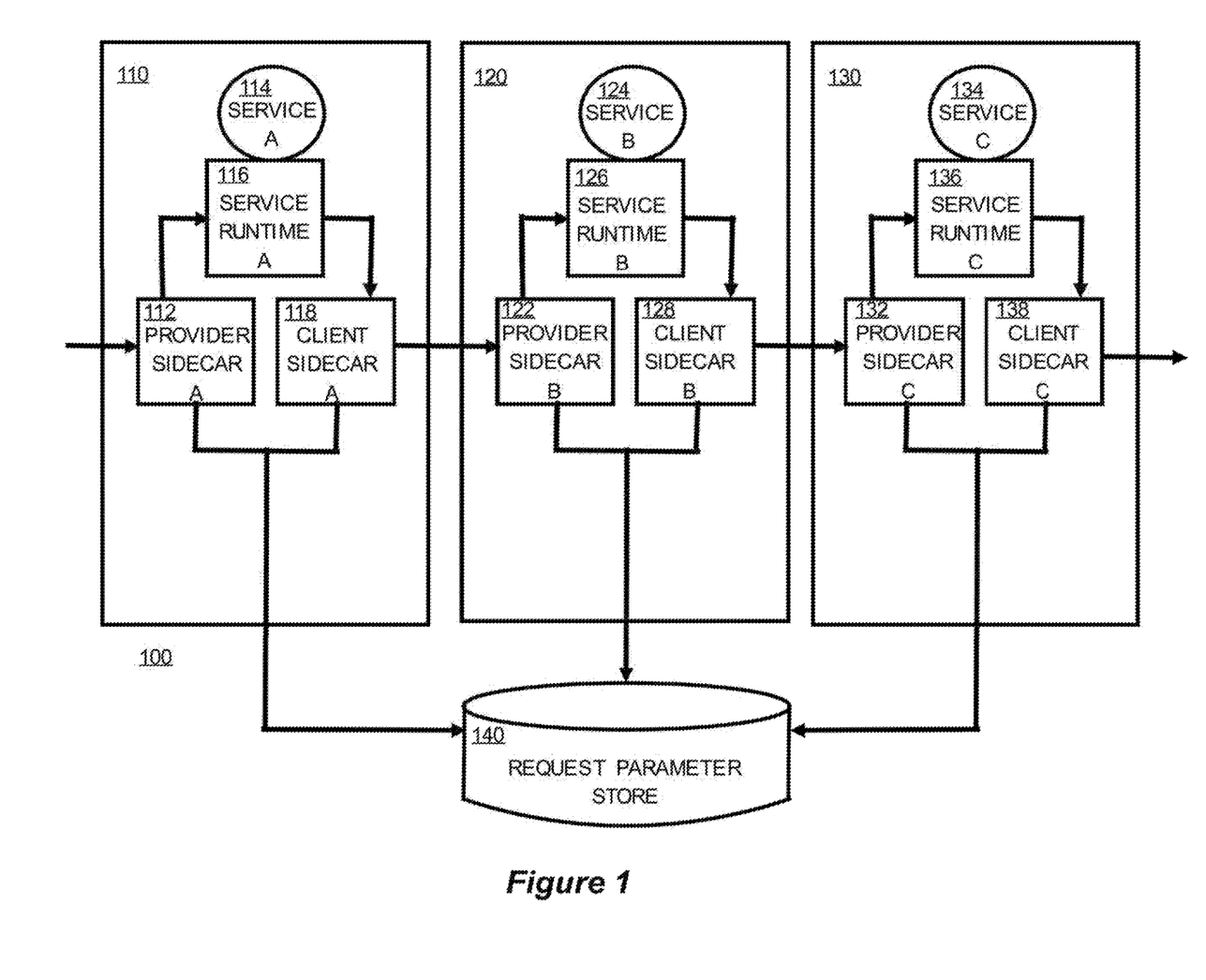
FIG. 1 is a block diagram of an exemplary service mesh incorporating a request parameter store according to an embodiment of the present invention.

FIG. 1 is a block diagram of a first embodiment of the invention in which a service mesh 100 incorporates a Request Parameter Store 140. Three services, Service A 114, Service B 124 and Service C 134 are each deployed to respective Service Runtimes 116, 126, 136 on respective separate Hosts 110, 120, 130. A service 114, 124, 134 and its respective service runtime 116, 126, 136 execute within the same process. Associated with each of the Service runtimes 116, 126, 136 are Provider Sidecars (PSc) 112, 122, 132 and Client Sidecars (CSc) 118, 128, 138 which are used, for example, to add Qualities of Service for the request, such as security, fault tolerance, routing and the like. Provider sidecars 112, 122, 132 and client sidecars 118, 128, 138 execute within a separate process from that in which service 114, 124, 134 and its respective service runtime 116, 126, 136 execute. However, provider sidecars 112, 122, 132 and client sidecars 118, 128, 138 execute on the same host 110, 120, 130, so communications between provider sidecars 112, 122, 132 and client sidecars 118, 128, 138 are inter-process, but do not take place over a network. Embodiments of the invention are not limited to having three services and may have any number of services greater than one, that is, two or more services.

When a service mesh does not have a Request Parameter Store 140, a service request flows through a chain of service runtimes 116, 126, 136, such as from service runtime A 116 to service runtime B 126 and then to service runtime C 136. As the request reaches each of the service runtimes 116, 126, 136, the request is demarshalled by the service runtime 116, 126, 136. Marshalling refers to the process of transforming a representation of an object that was used for storage or transmission to a representation of the object that is executable. Demarshalling is the inverse of marshalling. The representations of the objects are service implementation code with demarshalling/marshalling provided by the service runtime 116, 126, 136. Before a request leaves each of the service runtimes 116, 126, 136 it is marshalled by the service runtime 116, 126, 136 transforming the memory representation of the object to a data format suitable for storage or transmission.

In an embodiment of the present invention, the sidecars 112, 118, 122, 128, 132, 138 are extended to optimize communication of data across the services 114, 124, 134 within the service mesh 100. The target service runtimes 116, 126, 136 are extended to provide "smart proxies" to the service implementation. The parameter data associated with each of the service requests is stored in, and retrieved from, a Request Parameter Store 140 by the sidecars 112, 118, 122, 128, 132, 138. The parameter data stored in the request parameter store 140 is identified by a hash which is sent in inter-service communications and which is used by services 114, 124, 134 to retrieve parameter data from the Request Parameter Store 140 if it is required. In an embodiment, the hash may be generated by provider sidecar A 112. In an embodiment, parameter data associated with a single service request may be identified by a plurality of hashes, each one of the plurality of hashes representing a portion of the parameter data. For example, if a service request passes customer data that includes both general information about the customer and the customer's address, then this customer data may be represented by two hashes, a first hash for the general customer data, such as, for example, first name, last name, date of birth and the like and a second hash for the customer's address. In other embodiments, a unique key, such as a name or an address, may be used in place of the hash.

Figure 2:
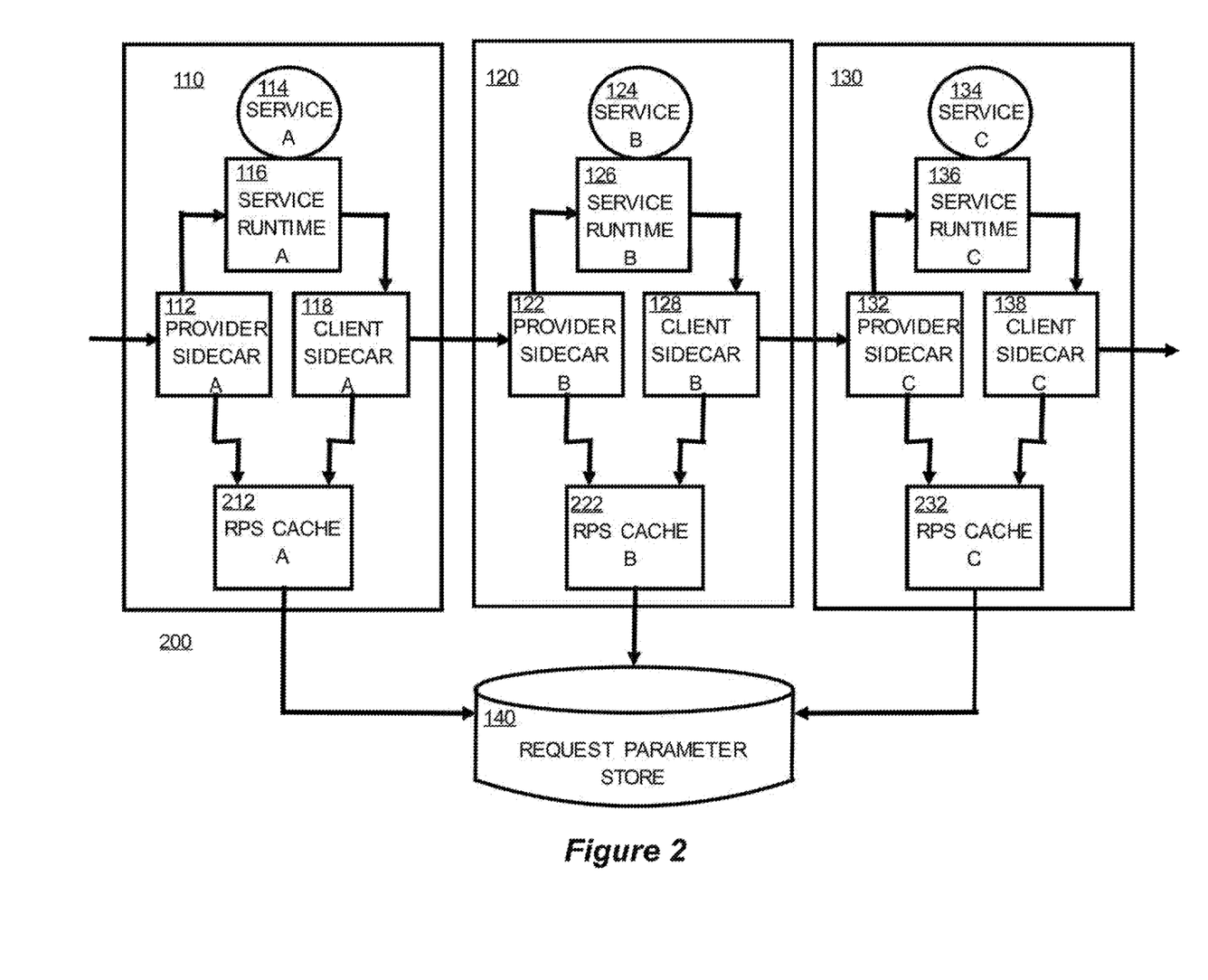
FIG. 2 is a block diagram of an exemplary service mesh incorporating a request parameter store and request parameter store caches according to an embodiment of the present invention.

FIG. 2 is a block diagram of a second embodiment of the invention in which a service mesh 200 further incorporates an RPS cache 212, 222, 232 associated with each of the service runtimes 116, 126, 136. Such RPS caches 212, 222, 232 are used to cache the requested data and to improve performance. Provider sidecars 112, 122, 132 and client sidecars 118, 128, 138 read and write parameter data from and to the RPS caches 212, 222, 232, the RPS caches 212, 222, 232 writing updated parameter data to the request parameter store 140. As described above, three services, Service A 114, Service B 124 and Service C 134 are each deployed to respective Service Runtimes 116, 126, 136 on respective separate Hosts 110, 120, 130.

Figure 3A:
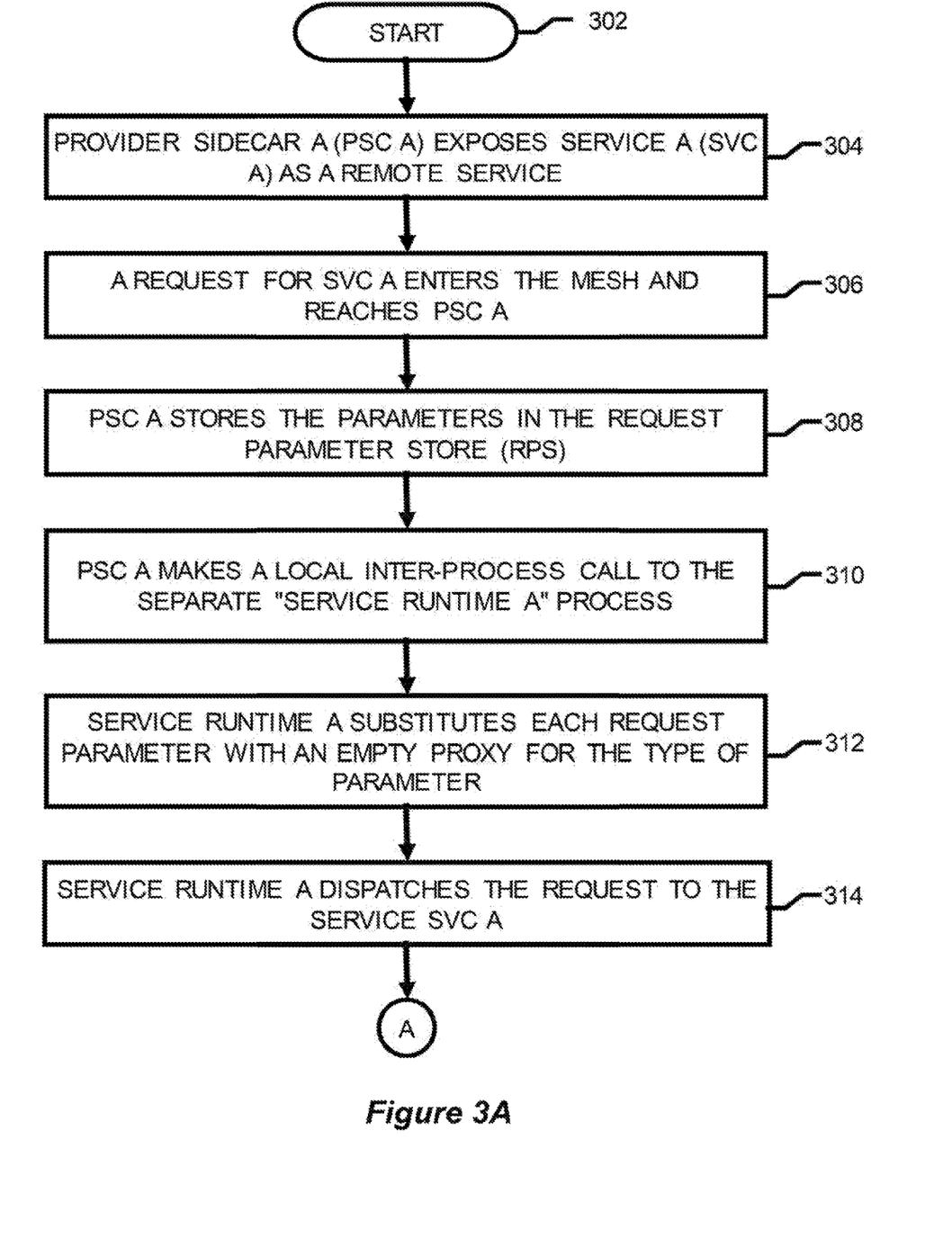
FIGS. 3A, 3B and 3C are a flow chart of a computer-implemented method according to an embodiment of the present invention.
Figure 3B:
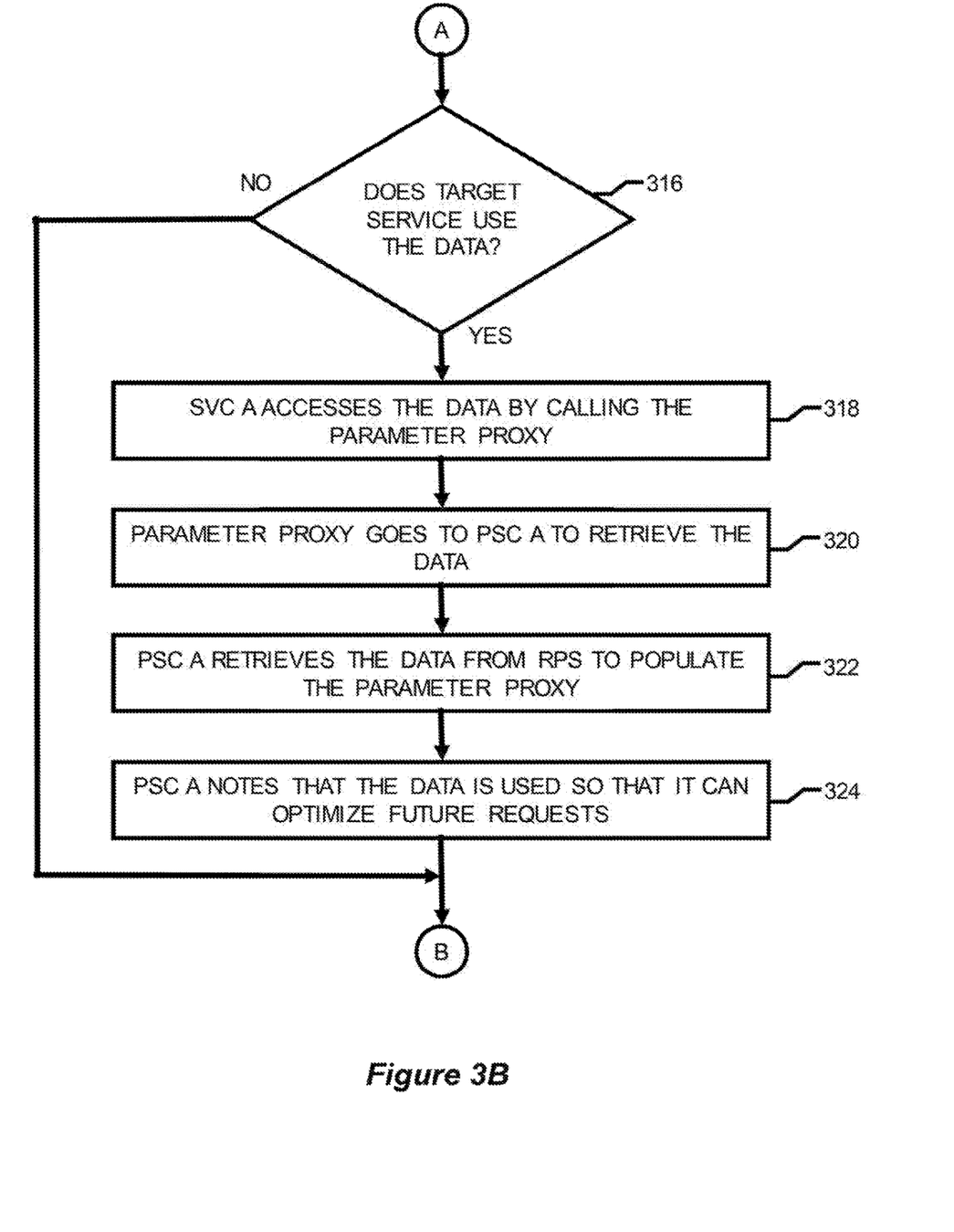
Figure 3C:
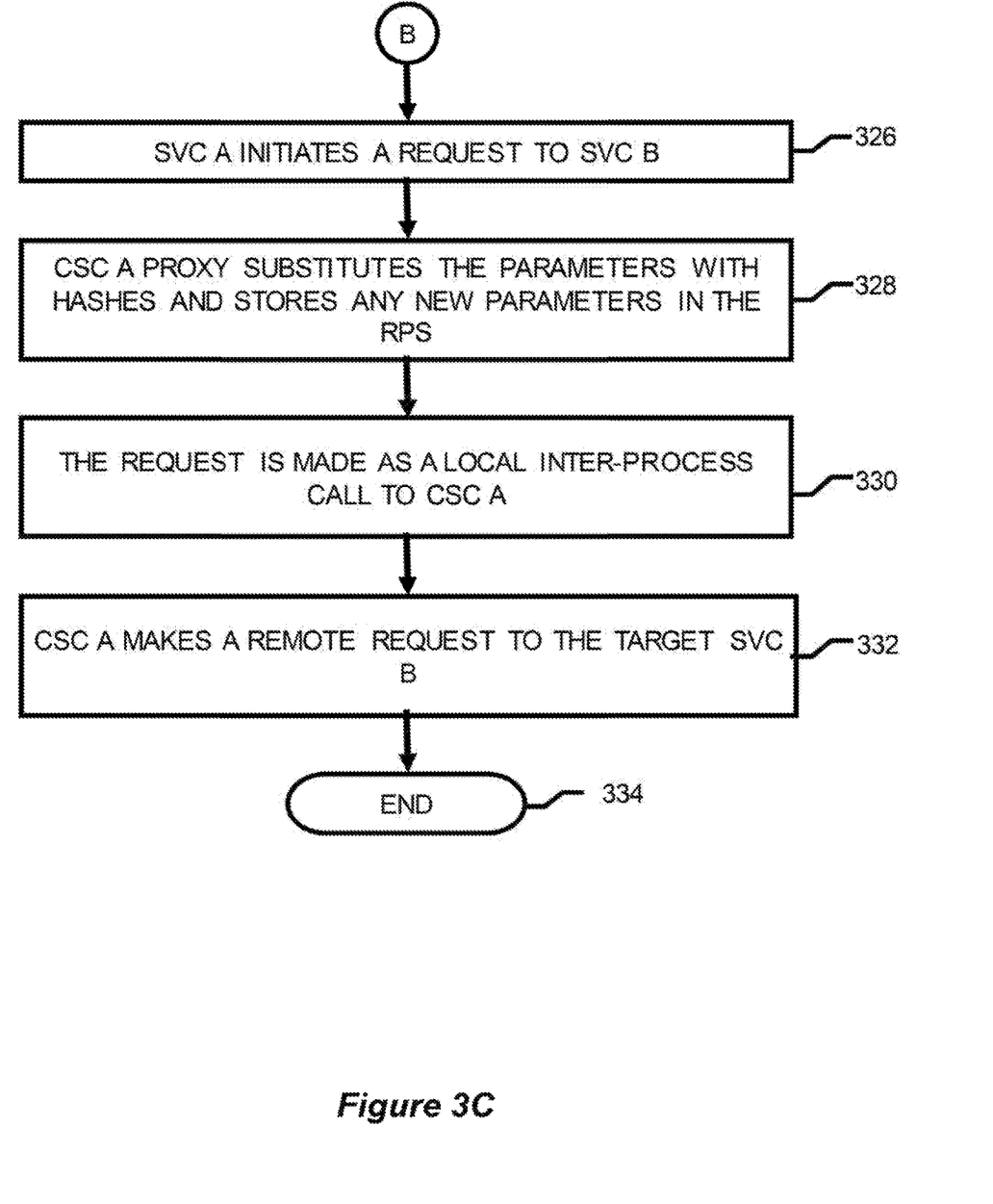

FIGS. 3A, 3B and 3C are a flow chart according to first and second embodiments of computer-implemented methods for optimizing parameter data passing between services in a microservice architecture employed with a service mesh. Referring to FIG. 3A, the computer-implemented method starts at step 302. At step 304, provider sidecar A 112 exposes, to a user of the service mesh 100, 200, service A 114 as a remote service. At step 306, a request for service A 114 is received at the service mesh 100 and reaches provider sidecar A 112. The received request includes parameter data.

Figure 4:
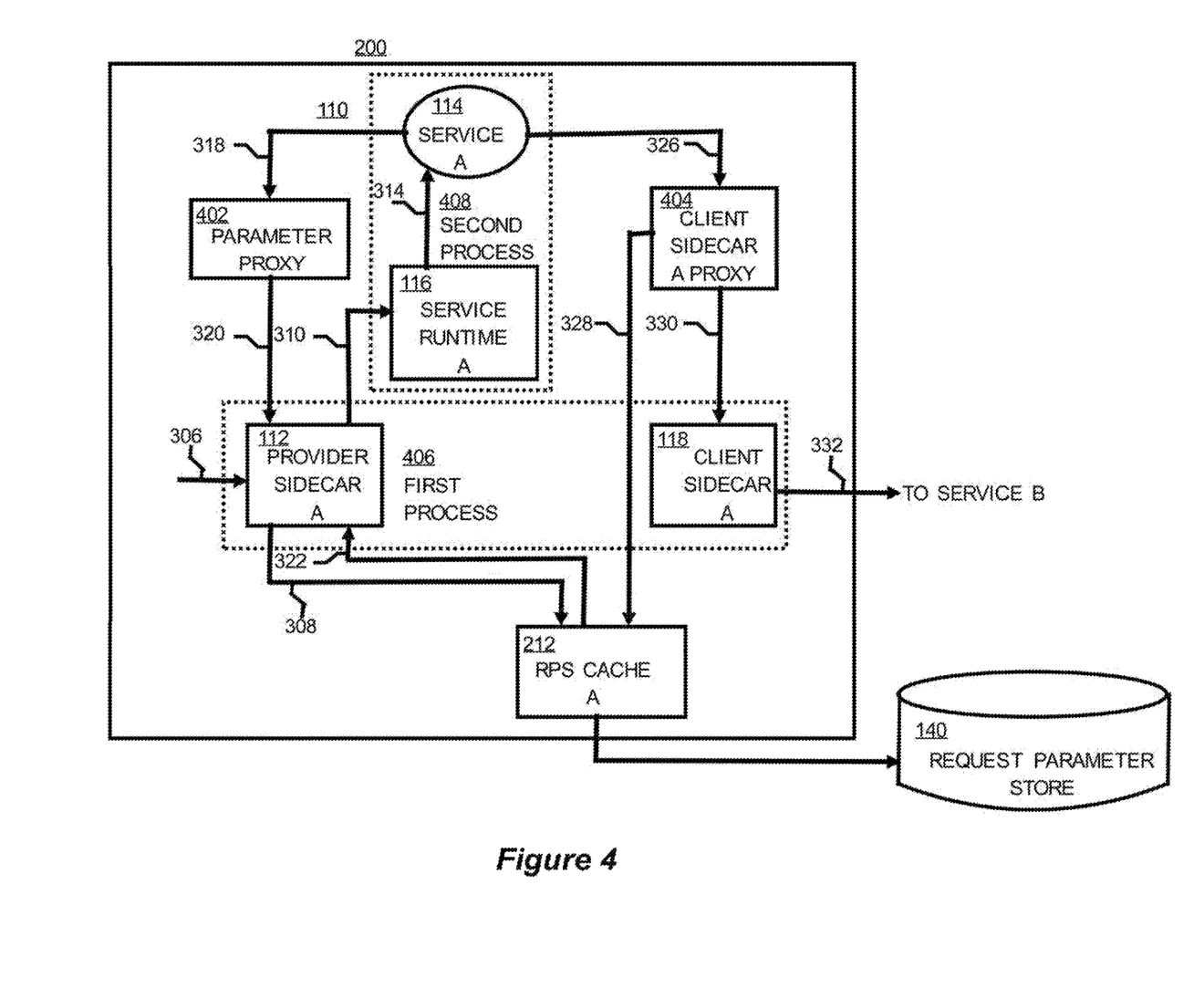
FIG. 4 is a block diagram of a host of FIG. 2, showing the steps of the method of FIG. 3, according to an embodiment of the present invention.

Referring briefly to FIG. 4, which is a block diagram of an embodiment of a host 110, 120, 130 of FIG. 2, showing the steps of the computer-implemented method of FIG. 3, the request 306 for service A 114 can be seen entering the service mesh 200 and reaching provider sidecar A 112. Provider sidecar A 112 and client sidecar 118 execute in a first process 406 and service A 114 and service runtime A 116 execute in a second process 408. Parameter proxy 402 and client sidecar proxy 404 are used to communicate between the first process 406 and the second process 408.

In the first embodiment of the computer-implemented method, at step 308, provider sidecar A 112 stores the parameter data associated with the request in request parameter store 140. Each parameter is identified by a hash. Each of the hashes is passed around the service mesh 100 to enable elements within the service mesh 100 to access the data stored in the request parameter store 140 using the hash.

In the second embodiment of the computer-implemented method, at step 308, instead of provider sidecar A 112 storing the parameter data associated with the request in request parameter store 140, provider sidecar A 112 stores the parameter data associated with the request in RPS cache A 212. RPS cache A 212 operates as a cache to parameter data stored in request parameter store 140 in the conventional manner in which a cache to a store operates, as will be well-known to persons skilled in the art.

Referring briefly to FIG. 4, the provider sidecar A 112 can be seen storing 308 the parameter data associated with the request in RPS cache A 212.

At step 310, provider sidecar A 112 makes a local inter-process call to separate service runtime A 116 process. Provider sidecar A 112 passes the hash values for each piece of parameter data stored in request parameter store 140 to service runtime A 116 to allow service runtime A 116 to access the parameter data using the passed hash value if the parameter data is required.

Referring briefly to FIG. 4, the provider sidecar A 112 can be seen making a local inter-process call 310 to service runtime A.

At step 312, service runtime A 116 substitutes each request parameter with an empty proxy for the type of parameter. Preferably, the "empty" proxy contains the hash or hashes associated with the request parameter. Also preferably, the "empty" proxy is arranged so as to call back to the service runtime 116, 126, 136 or to the provider sidecar 112, 122, 132 to fetch the parameter data, passing the stored hash or hashes to identify the parameter data that needs to be retrieved.

At step 314, service runtime A 116 dispatches the request to the service A 114.

Referring briefly to FIG. 4, dispatched request 314 can be seen and includes an empty proxy 402 for each parameter.

Referring to FIG. 3B, at step 316, if service A 114 does not use any of the parameter data associated with the service request, then processing proceeds through connector B to step 326 in FIG. 3C and the parameter data is never transmitted to Host A 110. If the service A 114 does use any of the parameter data associated with the service request, then processing proceeds to step 318. Service A 114 using the data is determined by service A 114 trying to access the data using the hash.

At step 318, responsive to service A 114 using the parameter data, service A 114 accesses the parameter data in the request parameter data store 140 by calling the proxy for each parameter of the service request which is required to be used by service A 114.

Referring briefly to FIG. 4, the parameter proxy 402 can be seen being called 318 by the service A 114.

At step 320, the parameter proxy 402 goes to provider sidecar A 112 to retrieve the parameter data. In one variation of the first and second embodiments, this is done by parameter proxy 402 going directly to provider sidecar A 112 to retrieve the parameter data. In another variation of the first and second embodiments, this is done by parameter proxy 402 going via service runtime A 116 to provider sidecar A 112 to retrieve the parameter data.

Referring briefly to FIG. 4, the first of these variations is shown as parameter proxy 402 going 320 to provider sidecar A 112 to retrieve the parameter data.

In the first embodiment, at step 322, provider sidecar A 112 retrieves the parameter data from request parameter store 140 in order to populate the corresponding parameter proxy 402. In the second embodiment, at step 322, provider sidecar A 112 retrieves the parameter data from RPS cache A 212 to populate the corresponding parameter proxy 402. If the parameter data is not available from RPS cache A 212, then the parameter data is fetched from the request parameter store 140 and added to the RPS cache A 212.

Referring briefly to FIG. 4, provider sidecar A 112 can be seen retrieving 322 the parameter data from RPS cache A 212 according to the second embodiment to populate the corresponding parameter proxy 402.

Optionally, at step 324, provider sidecar A 112 notes that the parameter data is used by service A 114 so that it can optimize future service requests. Either the parameter data is known to be used and so the parameter proxy 402 contains the parameter data instead of the hash, or the parameter data is known to be used somewhere down the sequence of services 114, 124, 134 and is passed directly down by the service mesh 100, 200, to pre-populate the RPS cache 212, 222, 232 for the target service 114, 124, 134. The provider sidecar 112, 122, 132 may check as to whether the parameter data is used, retrieve it from the RPS cache 212, 222, 232 and pass it to the service runtime 116, 126, 136.

Optionally, this may be done out-of-band and ahead of the service request arriving. For example, provider sidecar A 112 may determine that service A 114 always uses parameter data containing name information or parameter data containing physical address information and so passing this parameter data to service runtime A 116 ahead of the service request arriving may optimize future service requests. Processing proceeds through connector B to FIG. 3C.

Referring to FIG. 3C, at step 326, service A 114 initiates a service request to service B 124. This service request is made as a local inter-process call to client sidecar A 118. The parameter data in the service request is replaced by a unique token, or a plurality of unique tokens identifying the parameter data in the request parameter store 140. In a preferred embodiment, the unique token is a hash.

Referring briefly to FIG. 4, service A 114 can be seen initiating 326 a service request to service B 124.

In the first embodiment, at step 328, client sidecar A 118 proxy 404 substitutes the parameter data with the previously generated hashes, stores any new parameter data generated by service A 114 in the request parameter store A 140 and generates new hashes for any new parameter data. In the second embodiment, the new parameter data is stored in the RPS cache A 212 instead of the request parameter store 140. RPS cache A 212 writes the new parameter data into request parameter store 140 in a conventional manner as will be well known to the person skilled in the art of caching.

Referring briefly to FIG. 4, client sidecar A 118 proxy 404 can be seen substituting the parameter data with the previously generated hashes and storing 328, according to the second embodiment, any new parameter data generated by service A 114 in the request parameter store A 140.

At step 330, client sidecar A 118 proxy 404 makes a local inter-process call to client sidecar A 118.

Referring briefly to FIG. 4, client sidecar A 118 proxy 404 can be seen making a local inter-process call 330 to client sidecar A 118.

At step 332, client sidecar A 118 makes a remote request to the target service B 124 and steps 304 onwards are repeated, but with service B 124 and other associated elements in host B 120 being substituted for the corresponding elements in host A 110. For example, at step 316 when executed in service B 124, a check is made as to whether service B 124 uses the parameter data and at step 318 to 322, responsive to service B 124 using the parameter data, the parameter data is retrieved from the request parameter store 140.

Referring briefly to FIG. 4, client sidecar A 118 can be seen making a remote request 332 to the target service B 124. If service B 124 makes a call to service C 134, then steps 304 onwards are repeated, but with service C 134 and other associated elements in host C 130 being substituted for the corresponding elements in host A 110. When service B 124 or service C 134 has completed processing the received request including updating any parameter data stored in request parameter store 140, the request returns, with any returned parameter data being accessed by the calling process from request parameter store 140. This means that if, for example, service B 124 does not access parameter data created by, or modified by, service C 134, then it has a reduced overhead handling the parameter data because the parameter data is hashed, proxied and cached. The computer-implemented method ends at step 334.

Embodiments of the invention provide a more efficient means to pass parameter data between a number of microservices 114, 124, 134. This compensates for the additional costs of splitting up a single application into a microservice architecture.

As embodiments of the method according to the present invention are executed, the embodiments can learn which services 114, 124, 134 access which parameter data and therefore the embodiments are able to optimize parameter data delivery. Access patterns of the services 114, 124, 134 are used to determine the parameter data required by each of services 114, 124, 134. In an exemplary system in which there is a sequence of one hundred microservices 114, 124, 134, the one hundredth microservice 114, 124, 134 accesses the parameter data. The embodiments learn that the one hundredth microservice 114, 124, 134 accesses the parameter data and instead of waiting for the provider sidecar 112, 122, 132 associated with the one hundredth microservice 114, 124, 134 to request the parameter data, the data is delivered to the host 110, 120, 130 in which the one hundredth microservice 114, 124, 134 is executing ahead of time thus reducing the execution time. Preferably, the data is delivered to an RPS cache 212, 222, 232 located in the host 110, 120, 130.

In a variation of the embodiments, a subsequent request for a service, the subsequent request being of the same or a similar type to a first request for a service, is directed to a second service that executed the first request, the second service using parameter data previously stored in the request parameter store cache associated with the second service. The parameter data may be delivered to the RPS cache 212, 222, 232 associated with the corresponding microservice 114, 124, 134 ahead of time and the service mesh 100, 200 may then subsequently apply "server affinity" to deliver the service request. In the example above, this may be done by delivery of the hash associated with the parameter data to the one hundredth microservice 114, 124, 134 if that microservice has an affinity to service requests of that type. The service mesh 100, 200 can advantageously route requests that contain parameter hashes to the server or servers where the real data has been pre-fetched and is thus available without cost to the network. The RPS cache 212, 222, 232 in the one hundredth microservice 114, 124, 134 may then be pre-populated with the parameter data. This provides an optional optimization to embodiments of the present invention. The affinity between the request type and the microservice is a weak affinity because another microservice 114, 124, 134, such as, for example, the seventy ninth microservice 114, 124, 134, which will not have its RPS cache 212, 222, 232 pre-populated with the parameter data may process the service request with only few additional bytes needing to be transmitted due to the small size of the data hashes.

In another variation of the embodiments, the parameter data required by a second service may be identified, the parameter data may be provided to the second service and parameter data not required by the second service may be removed.

For core data types which are not proxyable, such as integer and string data, the provider sidecars 112, 122, 132 can still store the parameter data in the request parameter store 140 and optionally to the RPS caches 212, 222, 232. Whilst this parameter data will always need to be retrieved by the provider sidecar 112, 122, 132 to pass to the service runtime 116, 126, 136, any cases where the parameter is used on a host multiple times will be more efficient as the parameter data does not need to be passed as the parameter data is already in the request parameter store 140.

Figure 5:
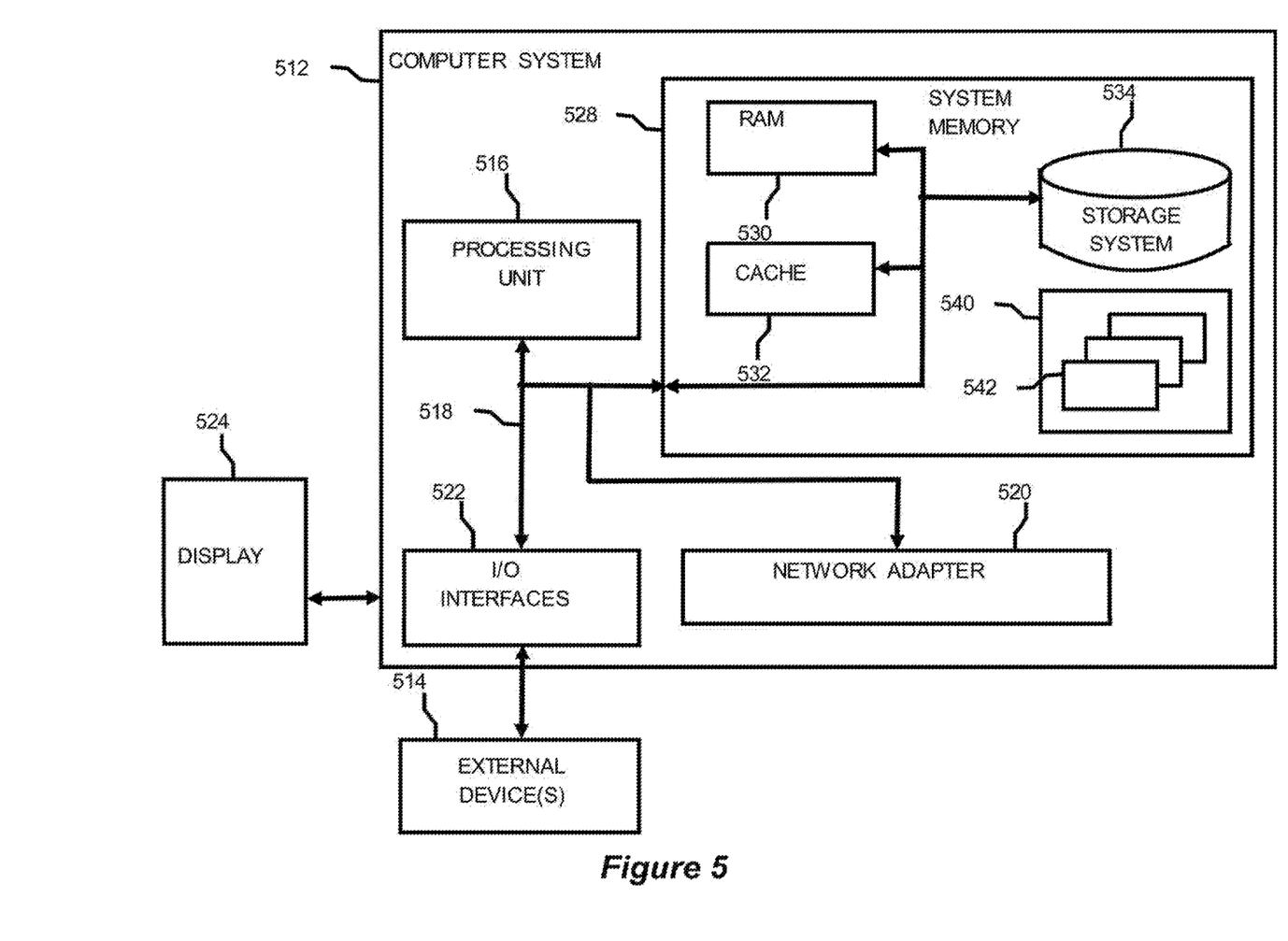
FIG. 5 depicts a computer system in which embodiments of the present invention may be implemented.

Referring now to FIG. 5, a schematic of an example of a computer system is shown. Computer system 512 is an example of a suitable computing system and is not intended to suggest any limitation as to the scope of use or functionality of embodiments of the invention described herein. Regardless, computer system 512 is capable of being implemented and/or performing any of the functionality set forth hereinabove.

Computer system/server 512 is operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 512 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 512 is shown in the form of a general-purpose computing device. The components of computer system/server 512 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 512 typically includes a variety of computer system readable media. Such media may be any available media that is accessible by computer system/server 512, and it includes both volatile and non-volatile media, removable and non-removable media.

System memory 528 can include computer system readable media in the form of volatile memory, such as random access memory (RAM) 530 and/or cache memory 532. Computer system/server 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer system/server 512 may also communicate with one or more external devices 514 such as a keyboard, a pointing device, a display 524, etc.; one or more devices that enable a user to interact with computer system/server 512; and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, column-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access a normalized search engine or related data available in the cloud. For example, the normalized search engine could execute on a computing system in the cloud and execute normalized searches. In such a case, the normalized search engine could normalize a corpus of information and store an index of the normalizations at a storage location in the cloud. Doing so allows a user to access this information from any computing system attached to a network connected to the cloud (e.g., the Internet).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
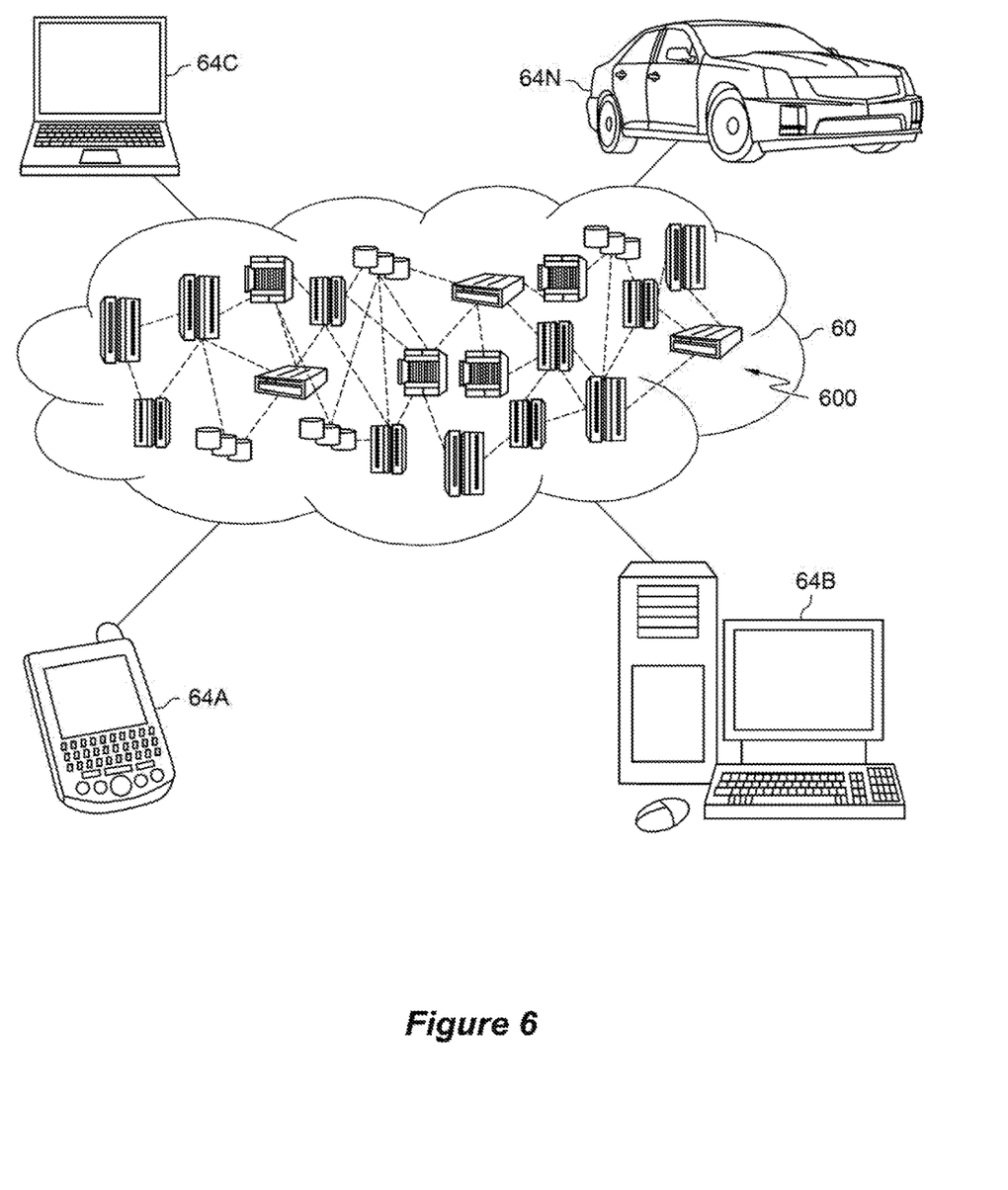
FIG. 6 depicts a cloud computing environment according to an embodiment of the present invention.

Referring now to FIG. 6, illustrative cloud computing environment 600 is depicted. As shown, cloud computing environment 600 includes one or more cloud computing nodes 60 with which local computing devices used by cloud consumers, such as, for example, personal digital assistant (PDA) or cellular telephone 64A, desktop computer 64B, laptop computer 64C, and/or automobile computer system 64N may communicate. Cloud computing nodes 60 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 64A-N shown in FIG. 6 are intended to be illustrative only and that cloud computing nodes 61 and cloud computing environment 600 can communicate with any type of computerized device over any type of network and/or network addressable connection (e.g., using a web browser).

Figure 7:
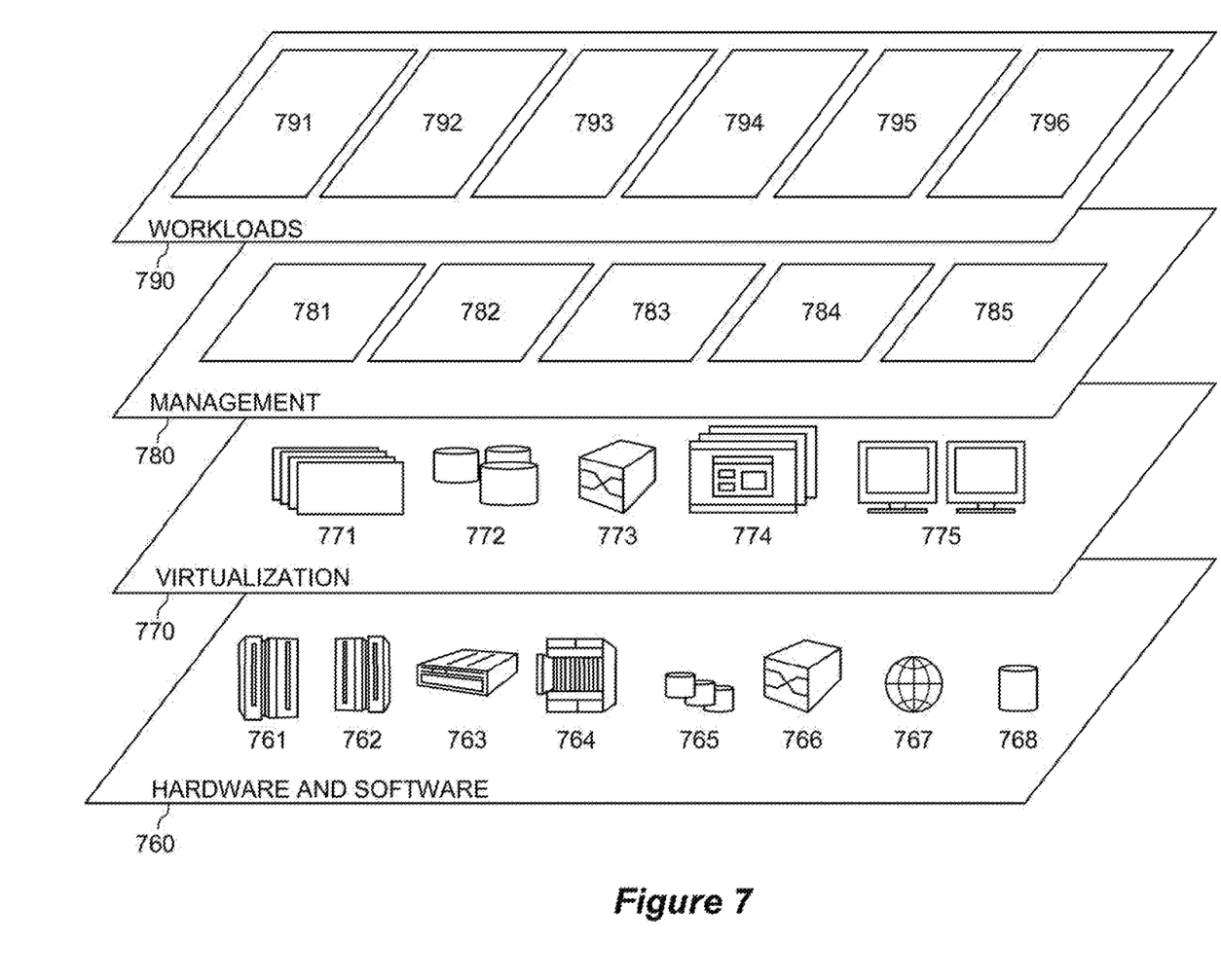
FIG. 7 depicts abstraction model layers according to an embodiment of the present invention.

Referring now to FIG. 7, a set of functional abstraction layers provided by cloud computing environment 600 (as shown in FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772, for example the data storage device 106 as shown in FIG. 1; virtual networks 773, including virtual private networks; virtual applications and operating systems 774; and virtual clients 775.

In an example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In an example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and log file management program 796. The log file management program 796 may manage optimizing large parameter passing in a service mesh.

What is claimed is:

1. A computer-implemented method for optimizing data file passing between services in a service mesh, comprising:
   receiving, at a first service, a first request for the first service, the first request comprising a first data file;
   storing the first data file in a request data file store, wherein a first hash identifies a first portion of the first data file and a second hash identifies a remaining portion of the first data file;
   responsive to the first service using the first portion of data file, retrieving the first portion of the data file from the request data file store;
   the first service initiating a request for a second service, the first data file in the second request being replaced by the first hash and the second hash identifying the first data file in the request data file store; and
   responsive to the second service using the remaining portion of the first data file, retrieving the second portion of the first data file from the request data file store.

2. The computer-implemented method of claim 1, wherein the storing the first data file in the request data file store and the retrieving the first data file from the request data file store utilizes a request data file store cache associated with each of the services.

3. The computer-implemented method of claim 2, wherein access patterns of the first and the second services are used to determine the first portion of the first data file and the remaining portion of the first data file required by each of the first and the second services, and further comprising storing the first data file in the request data file store cache associated with at least one of the first and the second services requiring the first portion of the first data file and the remaining portion of the first data file.

4. The computer-implemented method of claim 2, wherein a subsequent request for a service, the subsequent request for service being of the same or a similar type to either the first or the second request for service, is directed to an additional service that executed either the first or the second request, the additional service using either the first portion of the first data file or the remaining portion of the first data file previously stored in the request data file store cache associated with the additional service.

5. The computer-implemented method of claim 2, further comprising identifying either the first portion of the first data file or the remaining portion of the first data file required by the second service, providing either the first portion of the first data file or the remaining portion of the first data file to the second service, and removing either the first portion of the first data file or the remaining portion of the first data file not required by the second service.

6. An apparatus for optimizing data file passing between a first service and a second service in a service mesh, the apparatus comprising:
   a provider sidecar which receives a first request for the first service, the first request comprising a first data file and stores the first data file in a request data file store;
   a first service which, responsive to the first service using the first data file, requests the provider sidecar to retrieve the first data file from the request data file store, the first service initiating a request for a second service to a provider sidecar associated with the second service, the first data file in the request being replaced by a unique token identifying the first data file in the request data file store; and
   responsive to the second service using the first data file, the second service requests the provider sidecar associated with the second service to retrieve the first data file from the request data file store.

7. The apparatus of claim 6, wherein the first data file is stored in a request data file store cache and the first data file is retrieved from a request data file store cache, each of the first and the second services having an associated request data file store cache.

8. The apparatus of claim 7, wherein access patterns of the first and the second services are used to determine the data files required by each of first and the second services and the data files are stored in the request data file store cache associated with at least one of the first and the second services requiring the data files.

9. The apparatus of claim 7, wherein a subsequent request for a service, the subsequent request for service being of the same or a similar type to either the first or the second request for service, is directed to an additional service that executed the subsequent request, the subsequent service using data files previously stored in the request data file store cache associated with the subsequent service.

10. The apparatus of claim 7, wherein the first service identifies the first data file required by the second service, provides the first data file to the second service and removes first data file not required by the second service.

11. A computer program product for optimizing data file passing between services in a service mesh, the computer program product comprising:
    one or more computer-readable tangible storage medium and program instructions stored on at least one of the one or more tangible storage medium, the program instructions executable by a processor, the program instructions comprising:
    program instructions to receive, at a first service, a first request for the first service, the first request comprising a first data file;
    program instructions to store the a first data file in a request data file store, wherein a first hash identifies a first portion of the first data file and a second hash identifies a remaining portion of the first data file;
    responsive to the first service using the first portion of data file, program instructions to retrieve the first data file from the request data file store;
    program instructions to initiate a second request by the first service for a second service, the first data file in the second request being replaced by a unique token identifying the first data file in the request data file store; and
    responsive to the second service using the first data file, program instructions to retrieve the first data file from the request data file store.

12. The computer program product of claim 11, wherein the storing the first data file in the request data file store and the retrieving the first data file from the request data file store utilizes a request data file store cache associated with each of the first and the second services.

13. The computer program product of claim 12, wherein access patterns of the first and the second services are used to determine the first data file required by each of the first and the second services and the program instructions executable by the computer further causes the computer to store the first data file in the request data file store cache associated with at least one of the first and the second services requiring the first data file.

14. The computer program product of claim 12, wherein subsequent request for a service, the subsequent request for service being of the same or a similar type to either the first or the second request for service, is directed to the second service that executed the first request, the second service using the first data file previously stored in the request data file store cache associated with the second service.

15. The computer program product of claim 12, wherein the program instructions executable by the computer further cause the computer to identify the first data file required by the second service, provide the first data file to the second service, and remove the first data file not required by the second service.

* * * * *